US007176916B2

(12) United States Patent
Riaz

(10) Patent No.: US 7,176,916 B2
(45) Date of Patent: Feb. 13, 2007

(54) OBJECT IDENTIFYING SYSTEM FOR SEGMENTING UNRECONSTRUCTED DATA IN IMAGE TOMOGRAPHY

(75) Inventor: Umar Riaz, Webster, NY (US)

(73) Assignee: T.I.E.S., Inc., Rochester, NY (US)

( * ) Notice: Subject to any disclaimer, the term of this patent is extended or adjusted under 35 U.S.C. 154(b) by 13 days.

(21) Appl. No.: 10/907,801

(22) Filed: Apr. 15, 2005

(65) Prior Publication Data

US 2006/0232608 A1    Oct. 19, 2006

(51) Int. Cl.
*G06T 17/00* (2006.01)
(52) U.S. Cl. ..................................... 345/420
(58) Field of Classification Search ............... 345/420; 382/131; 378/65
See application file for complete search history.

(56) References Cited

U.S. PATENT DOCUMENTS

| 4,434,658 | A |   | 3/1984 | Miyazaki et al. |
| 5,421,330 | A |   | 6/1995 | Phillippe-Thirion et al. |
| 5,647,018 | A |   | 7/1997 | Benjamin |
| 5,901,199 | A | * | 5/1999 | Murphy et al. ............... 378/65 |
| 6,201,888 | B1 |   | 3/2001 | Kalvin |

| 2004/0223636 | A1 | * | 11/2004 | Edic et al. .................. 382/131 |

FOREIGN PATENT DOCUMENTS

| WO | WO 92/20032 | 11/1992 |
| WO | WO 97/05574 | 2/1997 |

OTHER PUBLICATIONS

Gordon et al., Reconstruction of Pictures from Their Projections, ACM, 1971, pp. 759-768.*
Jean-Phillippe Thirion, Segmentation of Tomographic Data Without Image Reconstruction, Transaction on Medical Imaging, vol. 11, No. 1 Mar. 1992.
Vaseem U. Chengazi, Thesis, Radiolabelled Monoclonal Antibody Studies of Prostate Cancer as the Basis for Development of Raw Data Segmentation and Analysis in Single Photon Emission Tomography, Univeristy of London, 1996, 154 pages.

* cited by examiner

*Primary Examiner*—Almis R. Jankus
(74) *Attorney, Agent, or Firm*—Stephen B. Salai, Esq.; Thomas B. Ryan; Harter Secrest & Emery LLP

(57) ABSTRACT

Tomographic projection data is segmented spatially by forming segmentation masks over the full outlines of objects appearing in isolation within selected data frame images. Further processing locates the object outlines in other data frames. Predictable effects of attenuation are used to attribute appropriate amounts of intensity to the segmented object space. Separate image reconstructions can be made of the segmented object data and the remaining projection data to independently optimize the reconstructions. Composite images can be made of the separate reconstructions.

37 Claims, 11 Drawing Sheets

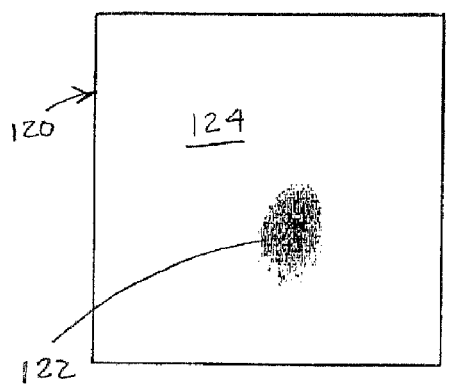 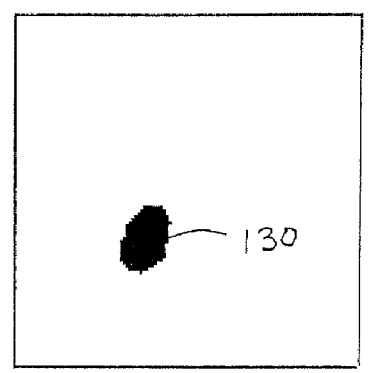
FIG. 6(a)　　　　　　FIG. 6(b)
FIG. 6(c)
FIG. 6(d)

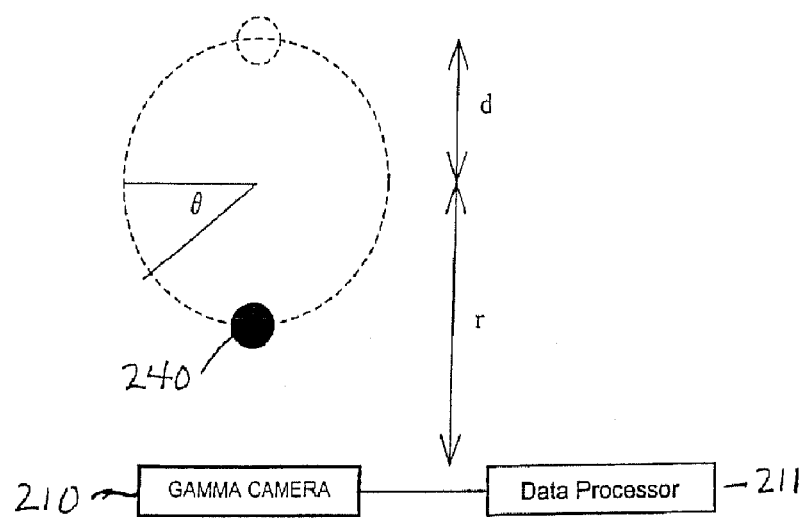
FIG. 8
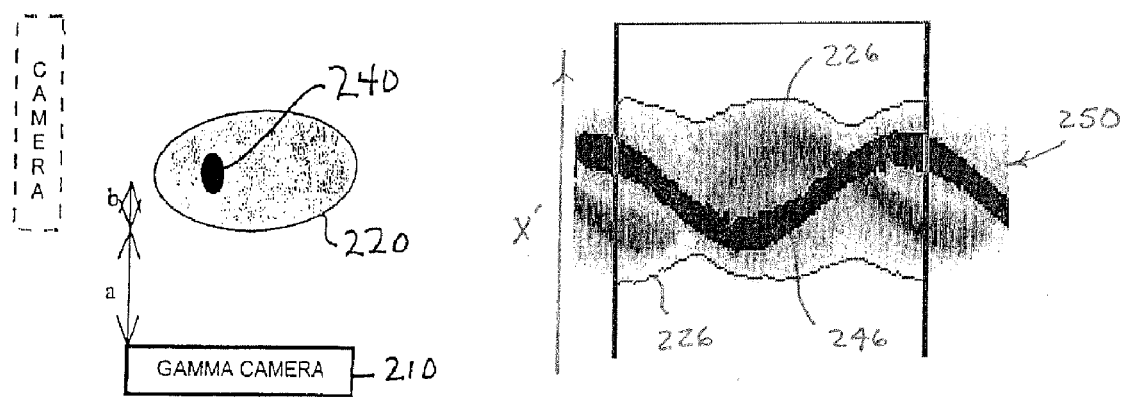
FIG. 9(a)   FIG. 9(b)

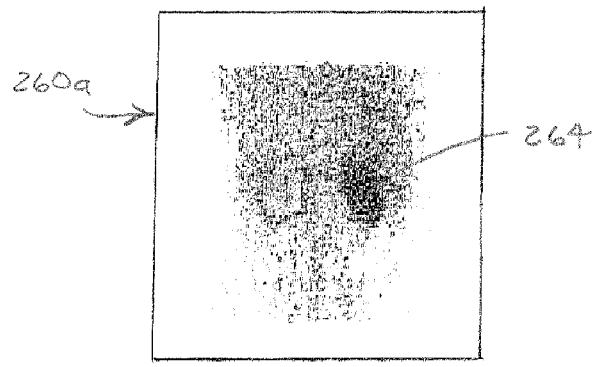
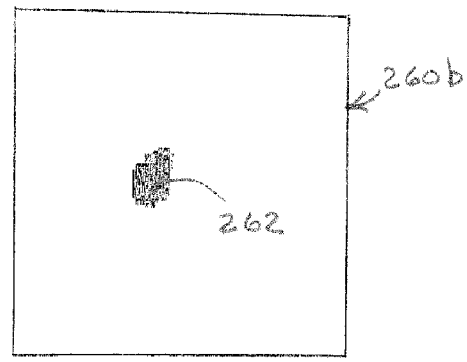
FIG. 11(a)  FIG. 11(b)
FIG. 11(c)
FIG. 11(d)

OBJECT IDENTIFYING SYSTEM FOR SEGMENTING UNRECONSTRUCTED DATA IN IMAGE TOMOGRAPHY

TECHNICAL FIELD

The invention relates generally to the field of image tomography, and in particular to methods of identifying, locating or analyzing objects of interest as well as tracking and segmenting or removing selected objects in SPET (single-photon emission tomography) or PET (positron-emission tomography) studies on the raw tomographic data.

BACKGROUND

The methodologies of SPET and PET are described in detail in several standard textbooks on Nuclear Medicine. Broadly speaking, the methodologies involve constructing a three-dimensional map of radioactivity sources within an entity or target body and displaying relative levels of radioactivity emanating from each of a plurality of volume elements making up the entity. The radioactivity sources are generally gamma radiation emitters (radiotracers), which have been injected into the body of a patient or other target body, and these are detected by a gamma camera which images a plurality of views of the body as illustrated in FIGS. 1 and 2. Three-dimensional mapping of other organic or non-organic entities is also achieved with this technique.

The gamma camera typically comprises a detector 10 and a collimator 15 adapted to image emissions parallel to the axis of the collimator, i.e., as depicted in FIG. 1(a), in the x direction. The camera rotates incrementally about an axis of rotation R, which is preferably coincident with the center of the target body 20; and successive images are captured at varying angles of theta degrees, for example, as shown at FIG. 1(b) where θ=45° and at FIG. 1(c) in the −y direction where θ=90°. Typically, images are taken every 2°–6°. The resulting set of images, also referred to as data frames, records total radiation counts for, or projections of, a plurality of parallel columns 22 passing through the target body 20. These images are then back-projected using known techniques to compute the relative number of counts originating from each pixel (i, j) of a matrix 35 shown in FIG. 1(d) representing a transaxial or transverse slice through the target body 20. Each pixel (i, j) has a finite thickness in the z direction along the rotational axis R, which is a function of the equipment and acquisition parameters being used, and thus corresponds to a volume element or "voxel" (i, j, k) occupying the transaxial or transverse (x-y) plane. Additional transaxial slices are imaged at succeeding positions along the z axis, and from this further information, relative numbers of radiation counts from all voxels in the target body 20 are calculated to reconstruct a three-dimensional "image" of radioactivity within the target body 20.

Such back-projection techniques are well known in the art but make a substantial number of approximations and assumptions about the collected data, which result in an effective filtering of the data when reconstructing the voxel data. In particular, back-projection techniques use an averaging process to determine the values of individual voxels, and thus introduce a smoothing effect, i.e. a high-frequency filtration of the data. Thus, the voxel map produced in the reconstructed image cannot be considered as "raw data", and further processing (e.g., for image enhancement or quantitative analysis) of the reconstructed data can encounter problems with unwanted filtering artifacts such as aliasing and the like.

For reconstructing an image, a digital data processing system back-projects to a predetermined back-projection matrix 35 or grid, such as that shown in FIG. 1(d). Because of this, a substantial amount of interpolation of the projected data is required when a projection such as that shown in FIG. 1(b) is not aligned with the back-projection matrix FIG. 1(d). In other words, the quantized x' axis of the camera must be mapped to the quantized x-y axes of the matrix 35. Various schemes exist for such interpolation, varying from "nearest-pixel" mapping to linear and even more complex interpolation methods, all of which introduce a further element of data filtration. Filtering is also required, subsequent to this interpolation in particular, to remove a so-called "star" artifact, which also introduces interdependence among voxel values that prevents derivation of accurate quantitative values.

Attenuation and scatter corrections also contribute to data filtering. Each projection image provides a total radiation count for a given column 22. A simple, but unsophisticated technique for back-projection is to assume, in the first instance, that the radiation count derives from sources distributed evenly throughout the length of the column, before weighting the projection data with counts from other images transverse thereto in the reconstruction process. However, this simplistic approach ignores known attenuation and scatter factors for radiation passing through the body 20, for which approximate corrections can be made during the back-projection process. Although resulting in a more accurate final image, such corrections also introduce filtering artifacts, which can further contaminate later data processing.

High intensity objects and sharp edges can also introduce a considerable amount of blur, including obscuring artifacts, into in the reconstructed image. Frequency domain highpass filters are often used to remove the blur, but there is no perfect way to remove this blur and associated obscuring artifacts within the images. If the intensities of some of the objects are much higher than others, then there will be more blur and hence more artifacts. If a high intensity object is located alongside a low intensity object, then the reconstruction artifacts could completely hide or distort the low intensity object in the reconstructed image.

All of the above factors can severely limit the ability to accurately quantify the reconstructed data derived from SPET and PET studies. In addition, the accuracy of quantitative data can be affected by other factors such as noise, sampling errors, detector characteristics, time variance of the radioactivity distribution during the period of acquisition, and the type of reconstruction algorithm and filtering used. Much work has been done towards estimating the effects of each of these factors and towards providing methods attempting to deal with the inaccuracies caused, such as those described in European Journal of Nuclear Medicine 19(1), 1992, pp. 47–61; K A Blokland et al: "Quantitative analysis in single photon emission tomography." However, none of the approaches are in widespread use and they fail to tackle a fundamental problem, namely, that of maintaining statistical independence of the sets of pixels or voxels of the reconstructed images (i.e., the projection data).

The quantitative measurement of radiation sourced from a region of interest within a body is a highly desirable goal in a number of fields. In particular, there are many clinical benefits to obtaining the quantitative measurements, such as enabling a clinician to more accurately locate and analyze a disease site in a scanned patient. The use of time as an additional factor in deriving quantitative data further enhances the ability to make dosimetry measurements for radionuclide therapy of cancer and other diseases. However, it will be understood that such techniques have a far wider applicability beyond aiding diagnosis and therapy of the living body.

There are two well-known reconstruction (inverse radon transform) techniques: an analytical solution based on Fourier transforms and an algebraic solution, such as ART (algebraic reconstruction technique) or the back projection method. A third technique, referred to as geometric tomography, processes raw projection data using a geometry-based approach to reconstruct the boundaries of objects. The technique provides a way to define geometrical surfaces, including their changes over time, but does not replace the digital images produced by conventional computed tomography for evaluating radiological distributions within the target body. A detailed description of geometric tomography can be found in a paper by Jean-Philippe Thirion, entitled Segmentation of Tomographic Data Without Image Reconstruction, published in *IIEEE Transactions on Medical Imaging*, Vol. 11, No. 1, March 1992 and in U.S. Pat. No. 5,421,330 to Thirion et al., which is hereby incorporated by reference.

An International Patent Application Publication WO 97/05574, entitled Raw Data Segmentation and Analysis in Image Tomography, describes the processing of raw tomographic data to isolate selected portions of the data, particularly objects defined by their radiological concentrations, for analyzing selected objects of interest or for removing the radiological contributions of selected objects that obscure the imaging of other portions of the data having more interest. The corresponding International Application No. PCT/GB96/01814 is also incorporated by reference.

The suggested raw data segmentation can be used to remove one or more high intensity objects of little or no interest from the raw data so that the reconstructed images will provide a much clearer picture of the remaining objects. Artifacts are reduced while lighter intensity objects, which would not be visually apparent among the higher intensity objects, become visibly apparent in the reconstructed image.

Similar to geometric tomography, object boundaries are found by evaluating projection data arranged in a sequence of sinograms in which data collected for each transaxial slice is arranged in an array having a first axis along the intersection of the transaxial slice and the plane of the gamma camera (normal to the transaxial slice) and a second axis along the gamma camera's angle of acquisition. Individual objects appear as sinusoidal traces in the sinograms, each having an amplitude corresponding to the object's average distance from the rotational axis R and a thickness corresponding to the apparent width of the object within the transaxial slice at the considered angle of acquisition.

Different objects trace different sinusoidal traces that can overlap each other within the sinograms. Distinguishing one object from another within the sinograms involves considerable manual and computer processing. Typically, angular sections within each sinogram along which the object traces appear in isolation from other object traces are manually identified and various edge-finding and curve-fitting techniques provide approximations for completing the individual traces. However, in addition to the spatial boundaries of objects within sinograms, the radiological counts, which define the intensities of the objects, also overlap; and approximations are required to divvy the counts between the overlapping traces of the objects. The approximations are generally based on an interpolation between the number counts emitted by the object immediately before and immediately after the intersection of its trace with the trace of another object. Each sinogram within which the selected object appears must be separately evaluated out of the total number of transaxial slices at which projection data is collected. Thus, the segmentation of data is difficult, time consuming, and itself subject to variation depending on the accuracy with which the isolated sections of the object traces are identified and the rules for approximating of the remaining object data.

SUMMARY OF INVENTION

The invention, in one or more of its preferred embodiments, simplifies and expedites the selection and isolation of objects within the unreconstructed tomographic projection data for such purposes as maintaining the statistical independence of the object data, removing obscuring objects from image reconstructions, or providing composite image reconstructions based on different segmentations of the projection data. Instead of identifying objects by selecting isolated portions of their traces throughout a series of sinograms corresponding to the transaxial slices in which the object appears, objects can be identified by selecting isolated full views of the objects within the set of data frame images captured by the gamma cameras or other detectors at different angular positions around the target body. Object approximations can be made for the remaining data frame images to complete a three-dimensional definition of the object, which can be referenced either to the transaxial slices of the target body in which the object appears in cross section or to the series of sinograms in which the object appears as a sinusoidal trace through an angularly-sensitive arrangement of the projection data.

Once the object is spatially identified, an appropriate portion of the radiation counts from the projection data can be assigned to the object. Removing the selected object's contribution to the radiation counts enables an image of the remaining projection data to be reconstructed without the influence of the selected object on the reconstructed image. The deleterious influence of high-intensity objects for producing unwanted artifacts and blurring can be mitigated by reconstructing images based on projection data that has been segmented to remove the high-intensity object's contribution to the radiation counts. Conversely, the projection data pertaining to the selected object can be retained, and the remaining radiation counts attributable to other objects or features can be discounted for reconstructing an image of the selected object on its own scale of intensities.

A composite image of objects or groups of objects whose images are separately reconstructed in this manner can be produced to independently reference and scale the intensities of objects within the composite image. For example, groups of objects sorted by their intensities, functions, or radiological behaviors can be separately reconstructed within the same or different set of images. Different colors or other visual markers can be used to distinguish the groups within the composite images and to reference different scales of intensity. Thus, intensity variations among the low-intensity objects can be viewed and scaled independently of the intensities of the higher-intensity objects, which would otherwise overwhelm the subtler variations of the lower-intensity objects.

The segmentation process involves two steps: (a) the creation of segmentation masks for spatially isolating selected objects and (b) the attribution of appropriate radiation counts to the selected objects within their defined space. A number of different mask-creating techniques can be applied to the camera data frames to achieve the desired spatial definitions of selected objects; and other techniques, based on aspects of geometric predictability in the sinogram presentation, can be used to appropriately assign radiation counts to the unique spaces occupied by the selected objects. The techniques enable the acquisition of quantitative time-sensitive measurements of the radiological activities of the selected objects, and this additional information can be presented in a graphic or numerical format for supplementing or further interpreting the reconstructed images.

One version of the invention provides for determining areas occupied by an object within sinograms of unreconstructed tomographic data. Collimated photon counts are collected by sensors arranged along two spatial dimensions at each of a plurality of angular increments around a rotational axis. One of the spatial dimensions has at least a component transverse to the rotational axis, and another of the spatial dimensions has at least a component along the rotational axis. The photon counts are arranged in a set of data frames with each of the data frames having a pixel array referencing locations at which the photon counts are collected along the two spatial dimensions at one of the angular increments. One or more pixels are selected within an outline of an object from at least one of the data frames. A first routine identifies other pixels that are contiguous to the selected pixels in the at least one data frame and that satisfy a condition for being within the outline of the object. A second routine infers yet other pixels appearing in other of the data frames within outlines of the same object. Pixels throughout the set of data frames are arranged into a set of sinograms, having a first dimension referenced to one of the two spatial dimensions along which the photon counts are collected and a second dimension referenced to the angular increments around the rotational axis at which the photon counts are collected. The pixels within the object are represented as a set of circumferential traces within the set of sinograms, such that each circumferential trace defines a prescribed area within one of the sinograms occupied by the object.

For the purpose of first selecting pixels within the object, the set of data frames can be inspected to identify one or more data frames in which the object appears in isolation from other objects appearing within the set of data frames. One or more pixels within the object are preferably selected from each of a plurality of the data frames in which the object appears in isolation.

Areas bounded by the outlines of the selected object within the data frames define a set of masks. The sizes of the mask areas can be adjusted in one or more directions, such as by changing the condition that is required to be satisfied for identifying a pixel as being within the outline of the object. A curve or other approximation can be fit through the interior points within the object outlines to identify other pixels within the outlines of the same object appearing in other of the data frames. The outlines of the object in the remaining data frames can be found by identifying pixels that are contiguous to the fitted pixels and that satisfy the condition for being within the outlines of the object. Alternatively, curves can be fit through the identified outlines of the object for defining boundaries of the circumferential traces within the set of sinograms. To accommodate overlapping objects and other data influences that obscure object outlines, limitations can be imposed upon the amount of change allowed between the outlines of angularly adjacent data frames. In addition, collecting collimated photons in 180° separated pairs of angular increments provides a redundancy supporting a choice among corresponding paired data frames in which the object outline is most easily distinguished from its surroundings.

Another version of the invention involves a system for identifying objects among unreconstructed data in image tomography. A detector collects raw data in the form of collimated photon counts organized as a set of images from a plurality of angular positions around a rotational axis. A viewer presents the set of images as pixel arrays having a first dimension substantially traverse to the rotational axis and a second dimension substantially parallel to the rotational axis for referencing locations at which the photon counts are collected. A selector tool provides for selecting one or more pixels appearing within an object in at least one of the images. A filling tool identifies pixels that are contiguous to the selected one or more pixels and that satisfy a condition for being within the object. An interpolation tool infers which among the pixels in other of the images are also within the object. A data structure represents the object based on the pixels appearing within the object through the set of images as a collection of traces circumscribing the rotational axis at different linear positions along the rotational axis.

The interpolation tool in at least one of its possible forms relies in part upon an assumption that the circumscribing traces have a sinusoidal form with a unit frequency. Each of the circumscribing traces is preferably located within one of a set of sinograms having a first axis that delineates distances along one of the first and second dimensions of the pixel array and a second axis that delineates angular positions around the rotational axis. The circumscribing traces of the object can contain photon counts collected from the object as well as other photon counts collected from other objects within the set of images that are intermittently coincident with the circumscribing traces. A data processor can be used to distinguish the photon counts within the circumscribing traces that are collected from the object from other photon counts that are collected from the other locations by estimating expected variations in the photon counts with angular positions around the rotational axis as a result of distance variations between the object and the detector.

The pixels identified by the filling tool contribute to identifying portions of a plurality of the traces at different linear positions along the rotational axis. The selector tool preferably selects one or more pixels appearing within an object in a plurality of the images. The object preferably appears in isolation from other objects within the plurality of images in which the pixels are selected.

Another version of the invention produces composite images of target body cross sections based on multiple reconstructions of different segments of tomographic data. Collimated photon counts emitted by a target body at each of a plurality of angular increments around a rotational axis are collected and spatially referenced as statistically independent data corresponding to angular progressions about the target body. The statistically independent data corresponding to the angular progressions about the target body is divided into at least first and second data segments containing different portions of the statistically independent data. A first cross-sectional image of the target body is reconstructed from the first data segment, and a second cross-sectional image of the target body is reconstructed from the second data segment. The first and second cross-sectional images of the target body are combined to provide a composite image of the target body.

The spatially referenced photon counts are preferably arranged in data frames containing angularly distinguished outlines of the target body. Masks are preferably formed over areas bounded by outlines of a selected object within the data frames for distinguishing between the first and second data sets.

The first and second cross-sectional images are preferably visually distinguishable and have radiological values referenced to different scales. For example, the first and second cross-sectional images can be visually distinguishable on different color scales.

The photon counts within the first and second data sets can be quantified based on the statistically independent data. In addition, the photon counts can be temporally referenced for measuring radiological change within the first and second data sets. Both the quantified and temporally referenced photon counts can be graphically represented in the composite image.

BRIEF DESCRIPTION OF THE DRAWING FIGURES

FIGS. 1(a)–1(c) depicts the collection of projection data through a transaxial plane of a target body with a gamma camera oriented at different angles around the target body. FIG. 1(d) shows a grid for the transaxial plane referenced in Cartesian coordinates.

Figure 4A:
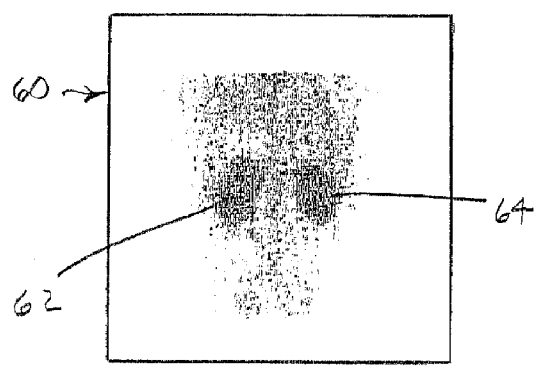
Figure 4B:
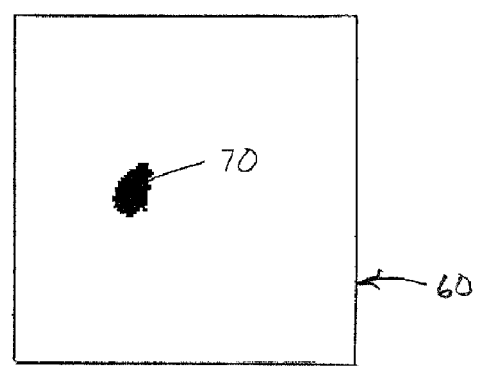
Figure 4C:
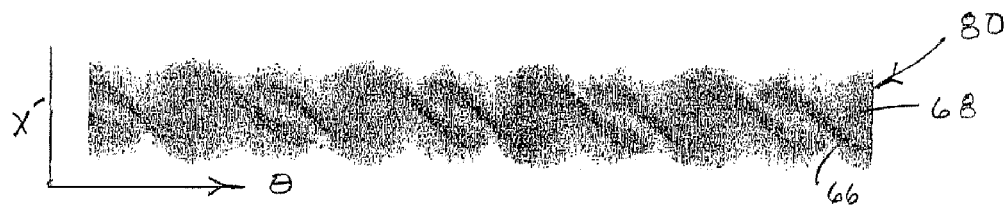
Figure 4D:
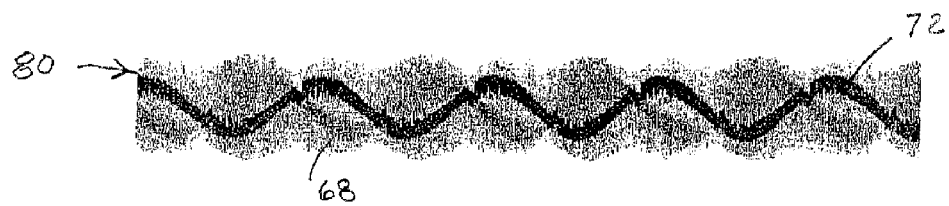
Figure 4E:
Figure 4F:
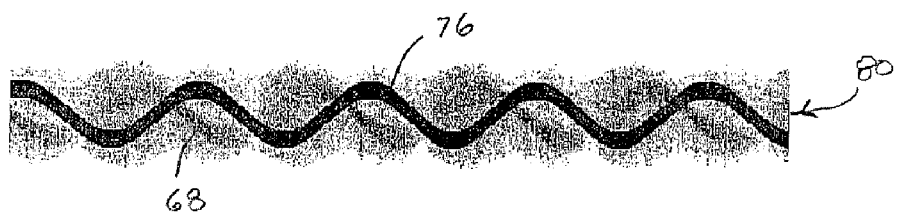

FIG. 4(a) shows projection data within one data frame image containing an isolated object, and FIG. 4(b) shows a segmentation mask sized to the isolated object. FIG. 4(c) shows the projection data laid out in a panoramic view of a set of sinograms. FIG. 4(d) through FIG. 4(f) display panoramic sinograms with segmentation mask traces created by three different methods.

Figure 5A:
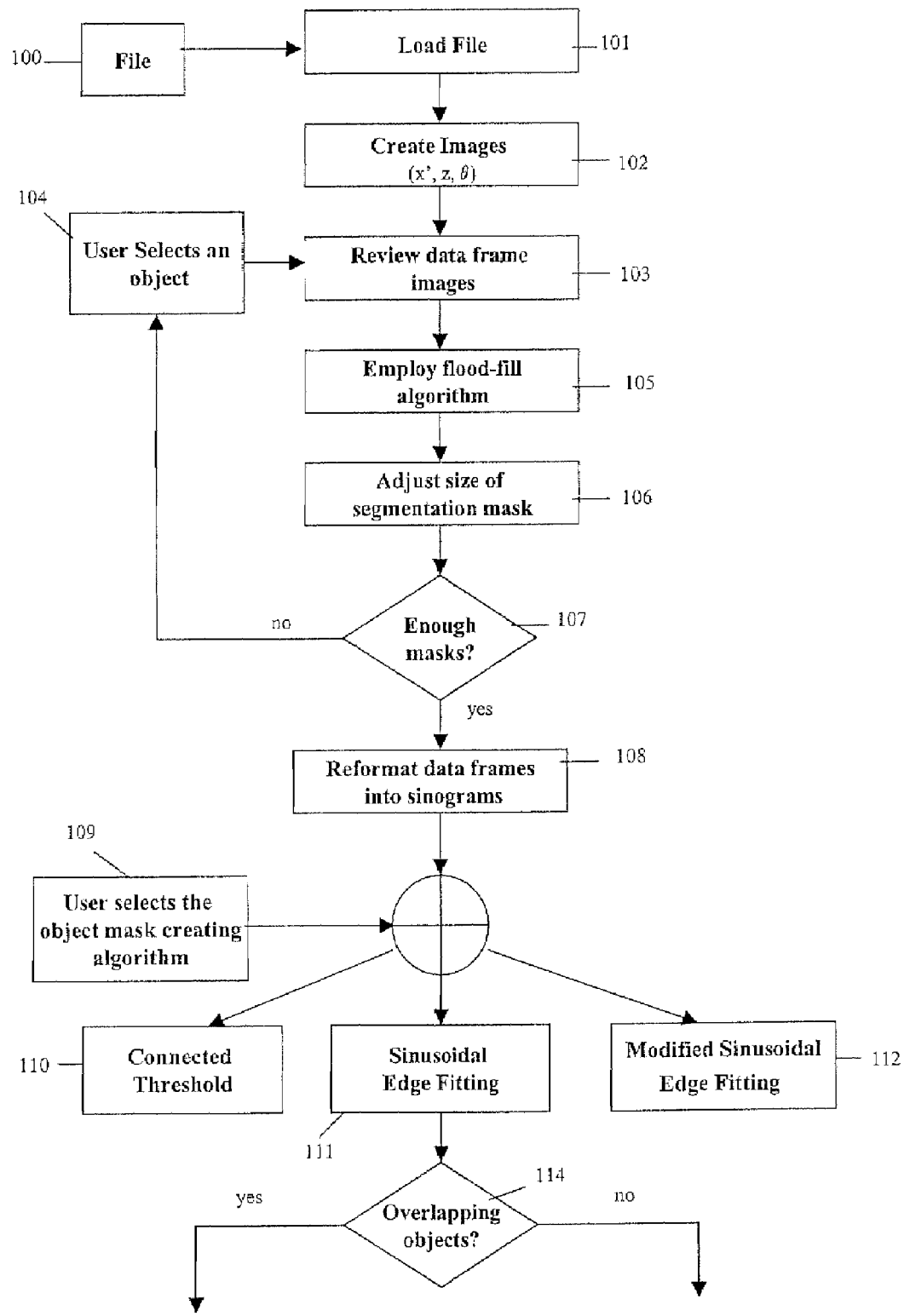
Figure 5B:
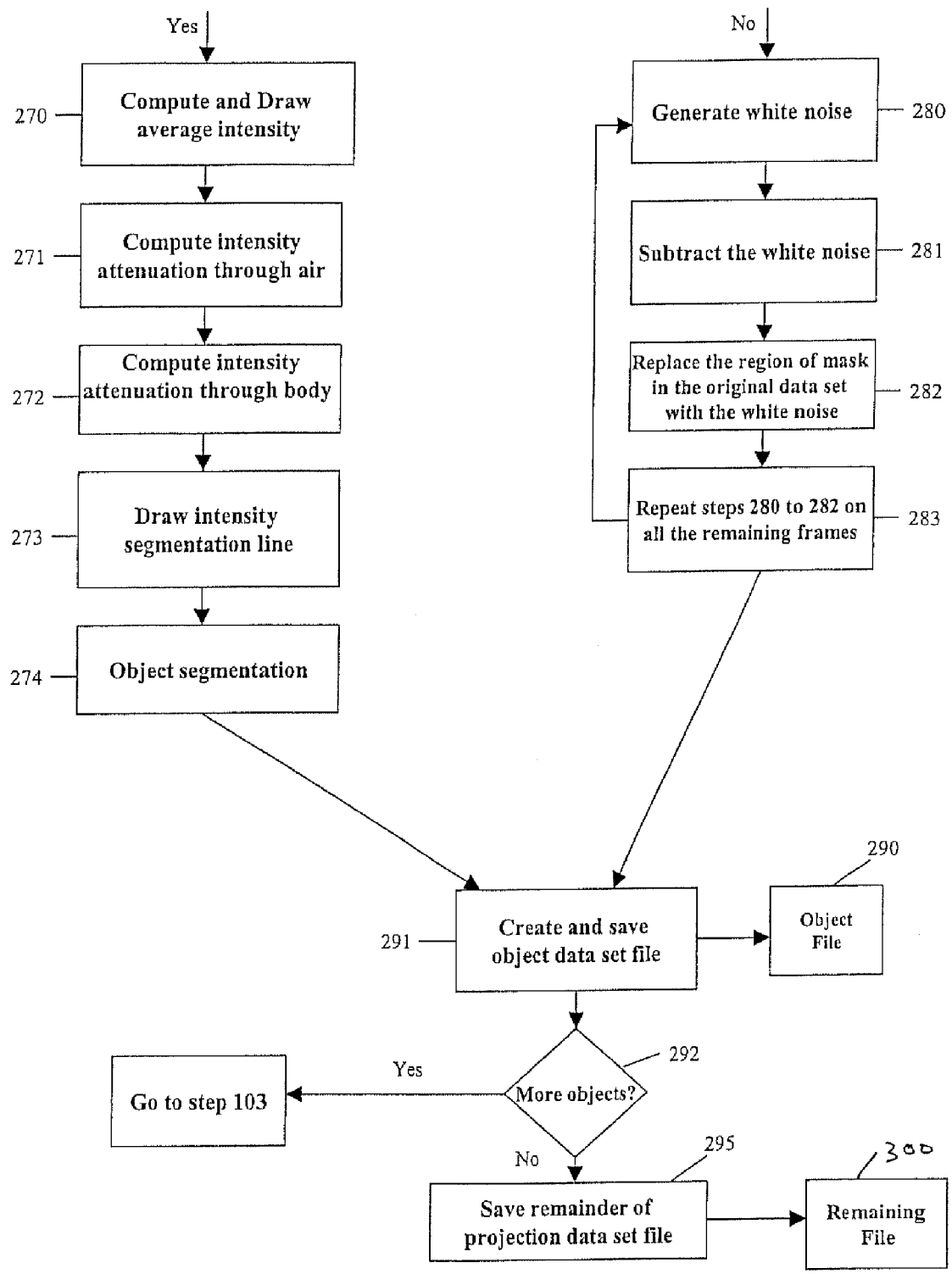

FIGS. 5(a) and 5(b) contain flow charts for spatially segmenting selected objects, attributing appropriate intensity counts to the selected objects, and storing the segmented projection data.

FIG. 6(a) shows projection data of an isolated object within a data frame image and FIG. 6(b) shows a segmentation mask sized to the isolated object. A panoramic set of sinograms containing a trace of the isolated object is shown in FIG. 6(c), and a segmentation mask trace is shown over the isolated object trace in FIG. 6(d).

Figure 7A:
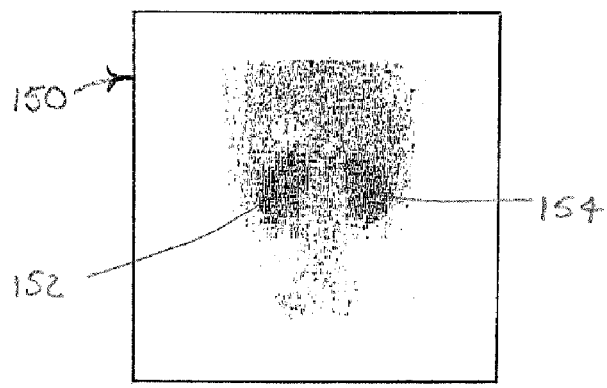
Figure 7B:
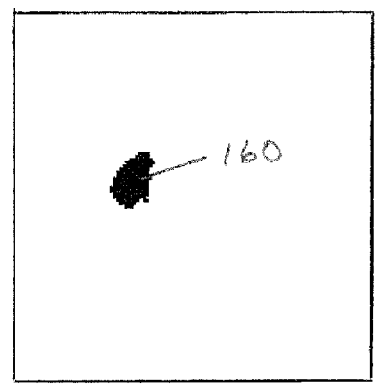
Figure 7C:
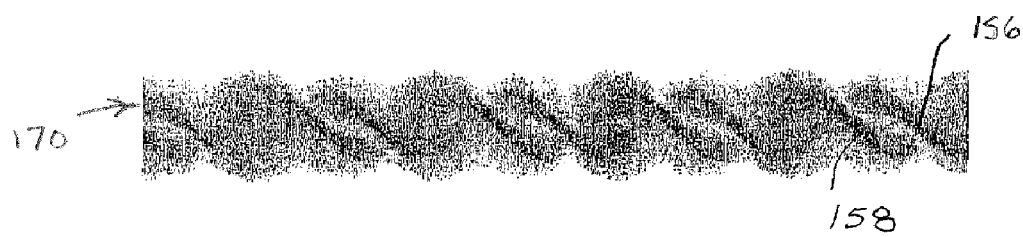
Figure 7D:
Figure 7E:

FIG. 7(a) shows projection data of two isolated objects within a data frame image and FIG. 7(b) shows a segmentation mask sized to one of the objects. A panoramic set of sinograms containing a trace of the one object is shown in FIG. 7(c), and a segmentation mask trace is shown over the one object trace in FIG. 7(d). FIG. 7(e) plots intensity counts within the segmentation mask trace through the succession of sinograms.

FIG. 8 presents a diagram used for formulating the effects of attenuation through air.

FIG. 9(a) presents a diagram used for formulating the effects of attenuation through body tissues. FIG. 9(b) is a sonogram showing position variations of an object with respect to a body outline through one complete revolution of the gamma camera.

Figure 10A:
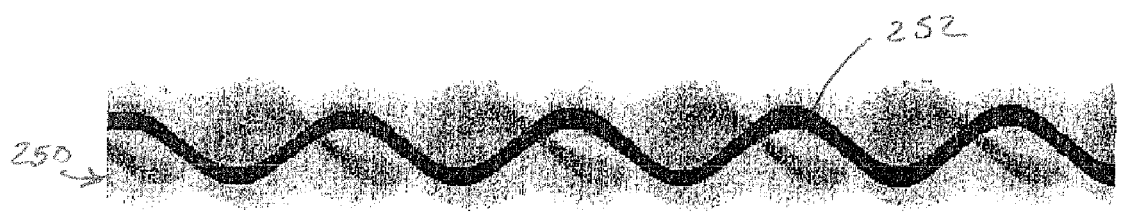
Figure 10B:
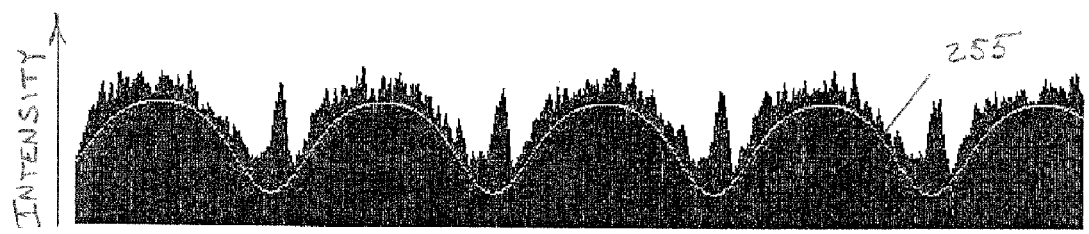

FIG. 10(a) shows a segmentation mask trace intersecting the trace of another object. FIG. 10(b) contains a plot of intensity as a function of projection angle for photon counts collected within the area of the segmentation mask trace, along with a line plot predicting the effects of attenuation with the cyclical changes in object distance from the gamma camera.

FIG. 11(a) shows a data frame image with intensity values associated with a selected object removed. FIG. 11(b) shows a data frame image of the selected object segmented from the remaining data imaged in FIG. 11(a). FIG. 11(c) shows a panoramic sinogram with the selected object removed. FIG. 11(d) shows a panoramic sinogram of the selected object.

Figure 12A:
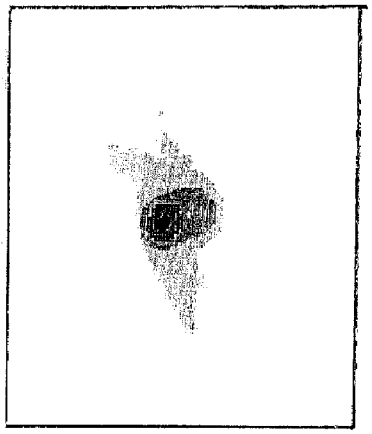
Figure 12B:
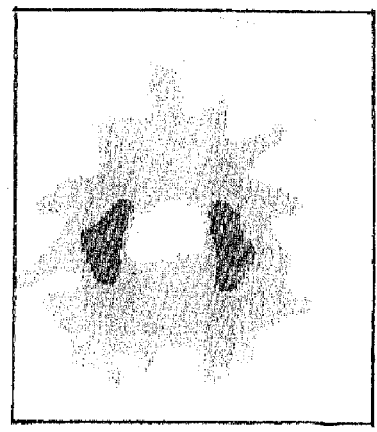
Figure 12C:
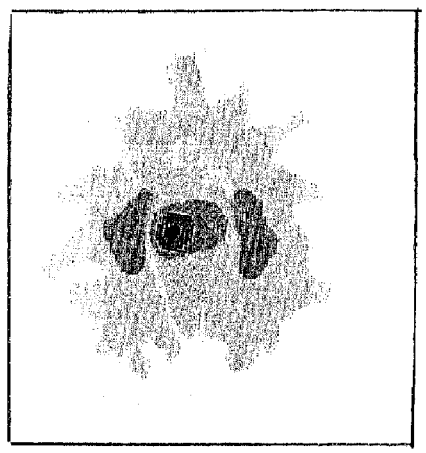
Figure 12D:
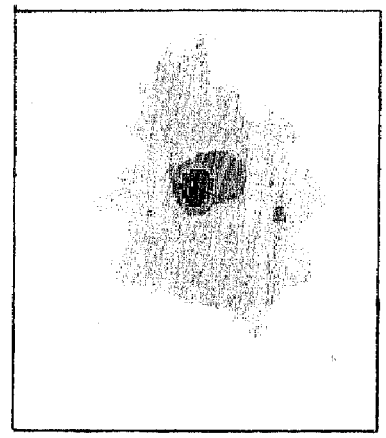

FIG. 12(a) is an image reconstruction of the segmented object. FIG. 12(b) is separate image reconstruction of the remaining projection data. The two image reconstructions of the same transaxial space are combined in FIG. 12(c). FIG. 12(d) is an image reconstruction of the original unsegmented projection data set for purposes of comparison.

DETAILED DESCRIPTION

The invention, as described below, provides for isolating the contributions of radiologically distinguishable objects from unreconstructed tomographic projection data. For example, unwanted contributions of high intensity objects can be removed from the unreconstructed tomographic data so that cross-sectional images reconstructed from the data are not adversely affected by the artifacts and blur otherwise produced by the high intensity objects. Alternatively, the isolated contributions of radiologically distinguishable objects collected from the unreconstructed tomographic data can be separately quantified or otherwise analyzed to determine their physical and radiological characteristics independently of the setting from which they are extracted. Separate reconstructions can be performed based on the segmented data, including reconstructions of the isolated objects or their remaining settings. The reconstructions can produce images that are combinable, yet independently evaluatable, on separate radiological scales.

An objective of the invention for accomplishing the desired data segmentation is to remove one or more objects from all frames of the tomographic projection data so cleanly that the remaining data frames appear as if the object was never present. Radiological counts within an object space cannot be completely removed without leaving black holes in the data frames that could also cause reconstruction artifacts. Accordingly, photon counts attributable to an isolated object are distinguished from counts that would otherwise be present within a similar setting. The space occupied by objects within sinograms is not unique because the sinusoidal traces of objects within the target body can overlap one another. Accordingly, additional information, analysis, or assumptions are required to separate the radiological counts between the overlapping object traces. Attenuation and scatter can affect the imaging of radiological point sources from differing angular perspectives, and physical and radiological changes during the course of data collection can further blur or distort the image reconstructions.

However, the mechanisms of attenuation and radiopharmaceutical change are at least partially predictable, and this a priori knowledge can be exploited to more closely divvy radiological counts between different objects or spatial regions. For example, attenuation is known to be a function of both distance between the radiation source and the detector and characteristics of the propagating mediums. Pharmacokinetic redistributions are generally linear in terms of either accumulation or discharge.

Another objective of the invention is to improve the intensity resolution of the reconstructed image. Removing the adverse influences of high-intensity objects significantly improves intensity resolution both by eliminating artifacts and blur and by rescaling the image intensity so the remaining intensity variations occupy a larger portion of the available intensity range. Computer displays typically exhibit 256 monochrome intensity levels or n*256 levels if an n color profile is used. If the overall range of intensities requiring display is reduced, the resolution of the remaining intensity variations can be enhanced.

Figure 1A:
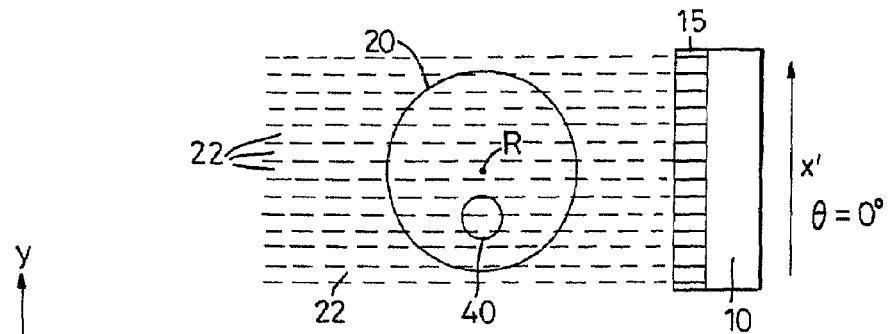
Figure 1B:
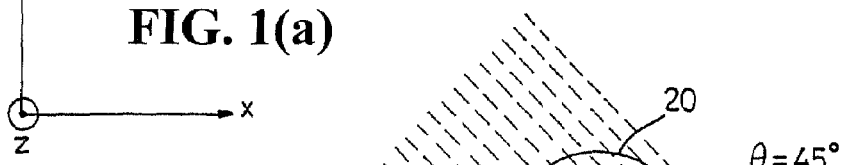
Figure 1D:
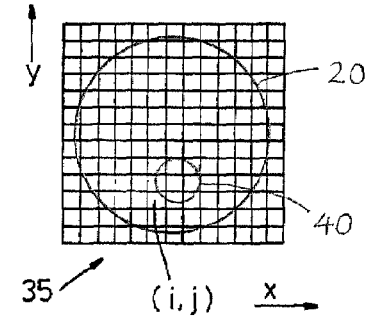
Figure 1C:
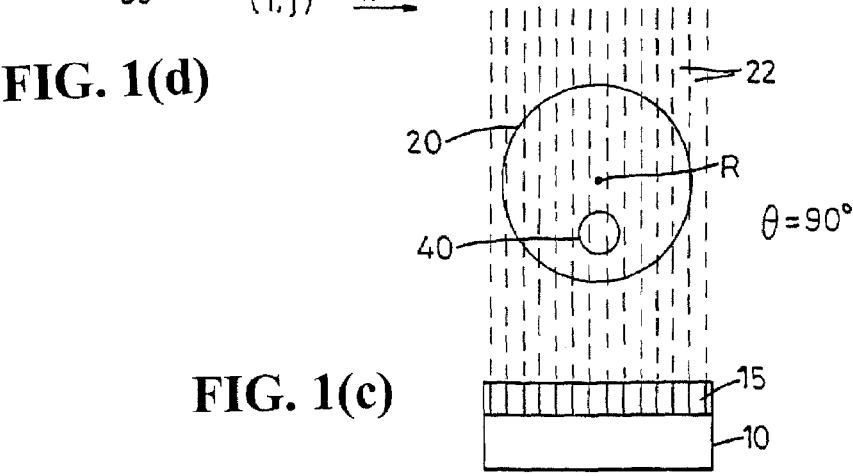
Figure 2:
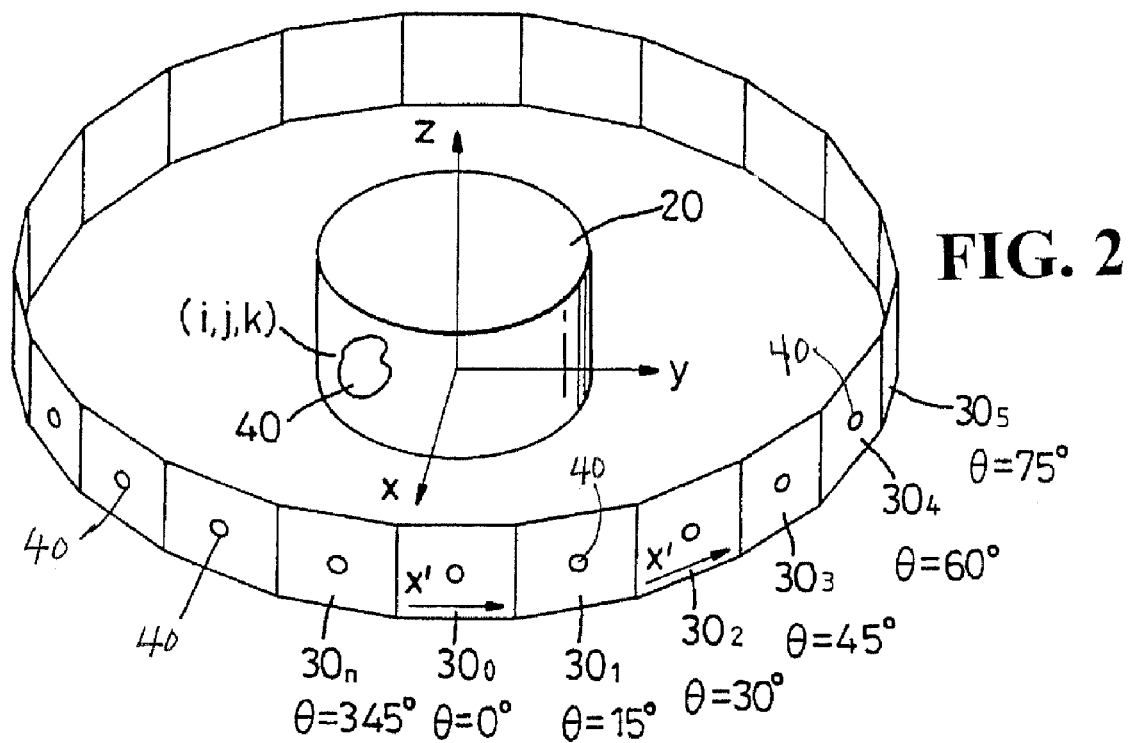
FIG. 2 depicts the accumulation of the projection data by the gamma camera in a series of data frames at approximately 15° increments around the target body.

FIGS. 1(a) through 1(c), as discussed above, illustrate the acquisition of projection data by a conventional tomographic data acquisition apparatus, which includes the gamma camera 10 that is incrementally indexed around the rotational axis R for collecting collimated photon counts from the target body 20 at a series of discreet angular positions, $\theta=0°$ through $\theta=360°$ in typical angular increments of 2° through 6°. Although appearing as a linear array in the views of FIGS. 1(a) through 1(c), the gamma camera 10 preferably includes a two-dimensional array of sensors extending in the illustrated x' dimension as well as in a z direction parallel to the rotational axis R. The objective of the two-dimensional arrangement of sensors is to acquire a series of data frames 30, as shown in FIG. 2, in which the target body 20 and its contents, e.g., the object 40, appear in silhouette from the different angular positions $\theta$ around the rotational axis R.

Figure 3:
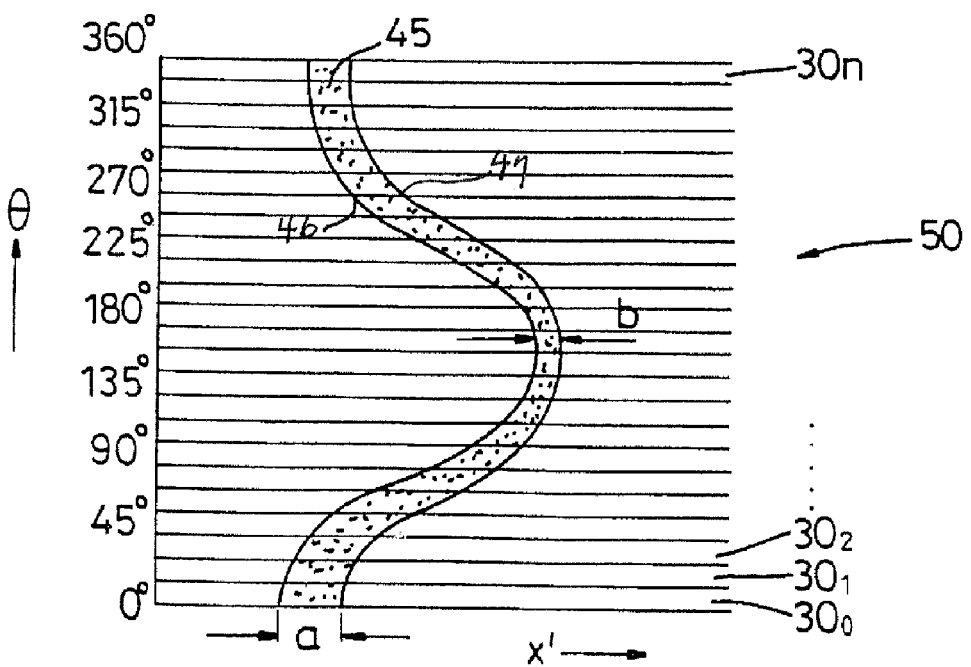
FIG. 3 shows a sinogram presentation of the projection data through a transaxial slice of the target body in which the vertical axis references the angle at which the data is collected and the second axis references distances along one dimension of the data frames.

Conventional reconstructive practices as well as prior efforts of pre-reconstructive data segmentation reorder the unreconstructed data (e.g., the collected photon counts) from the data frames 30 into sinograms 50 as shown in FIG. 3. Each such sinogram 50 extracts from the data frames 30 only the data (photon counts) acquired through a particular transaxial cross section of the target body 20 intended for imaging. For example, if the gamma camera sensors are arranged with rows extending in the x' direction and columns extending in the z direction, then each such sinogram 50 includes the results from a single row at each different angular increment in which the data is collected. As shown in FIG. 3, a horizontal axis of the sinogram 50 references the linear x' direction and a vertical axis of the sinogram 50 references the angular $\theta$ direction. The exemplary object 40 appears as a sinusoidal trace 45 in the sinogram 50 having an approximate amplitude corresponding to the distance of the object 40 from the rotational axis R and an approximate phase corresponding to the polar angle position of the object 40 around the rotational axis R. In fact, each point (i, j) in the transaxial plane x-y at a particular height z as shown in FIG. 1(d) traces its own sinusoid having an amplitude corresponding to its radial distance from the rotational axis R and a phase corresponding to its polar angle around the rotational axis R. The opposite side edges 46 and 47 of the sinusoidal trace 45 are formed by envelopes of sinusoids that vary in amplitude and phase with the position of the points (i, j) around the boundary of the object 40. As shown in FIG. 3, the width of the object 40 (as measured along its trace 45) varies between a maximum of "a" recorded at angle $\theta=0°$ and a minimum of "b" at angle $\theta=160°$.

Instead of demarcating sections of the sinograms to isolate the contribution of particular objects to the collected projection data, a preferred embodiment of the invention begins by processing the projection data as it appears in the original data frames 30. The two-dimensional array of photon counts collected by the gamma camera 10 can be viewed as a corresponding array of pixels exhibiting intensity variations in accordance with the photon counts. For example, FIG. 4(a) depicts a single data frame image 60 in which the two objects 62 and 64 are visible. An operator inspects the data frame images 60 in which a selected object 62 appears in isolation from other objects (e.g., object 64) or features. In other words, data frame images 60 are identified in which the outline of the object 62 is uninterrupted. One or more pixels within the object outline are selected, such as by use of a pointer superimposed upon the data frame images 60. A fill routine, such as a threshold flood-fill algorithm, is evoked to identify other pixels that are contiguous to the selected one or more pixels and that satisfy a condition for being within the outline of the object 62. Such conditions include a threshold jump or change in intensity (e.g., photon counts) or a rate of change in intensity indicative of an object boundary. The set of points satisfying the prescribed conditions defines a segmentation (object) mask 70 within which the object 62 is located and without which the object 62 is not located. The size of the segmentation (object) mask 70 can be adjusted in one or more directions by varying the conditions for associating individual pixels with the selected object 62. For example, an operator could adjust the size of the segmentation mask 70 using a threshold slider bar or by clicking dilate or erode buttons.

Since the tomographic projections across the target body 20 are taken at different angles $\theta$, the shape and location of the object outline does not remain the same within the data frame images 60. Accordingly, separate masks 70 are preferably created for at least four or five data frame images to at least approximately capture the location of the object 62 in real space. Areas outside the segmentation masks define volumes of space within which the object is not located. Preferably, the data frames 60 in which the segmentation masks 70 are formed include data frames separated by an odd multiple of 90° to exclude approximately orthogonally related volumes of space from the object 62.

Three different methods are contemplated to complete a set of segmentation masks 70 throughout the set of data frame images 60. Each is described separately below.

Connected Threshold:

The Connected Threshold method is based on a type of flood-fill algorithm known for growing regions within a threshold-defined boundary. However, the application of the algorithm is based on two assumptions regarding the remaining data frame images 60. First, a common center of the operator-defined segmentation masks 70 is assumed to correspond to a pixel within the object outlines of the remaining data frame images 60. Second, the change in the object outline between adjacent data frame images 60 is limited to a prescribed number of pixels in any direction. In addition, the change in object outline cannot require the object 62 to occupy a volume excluded by the segmentation masks 70 in other data frames.

A center of the object 62 can be estimated in the real x-y-z space of the target body 20 based on projections of the centers of the operator-defined segmentation masks 70. The estimated center can be re-projected into the remaining data frame images 60. Alternatively, the projection data can be reorganized into sinograms 80 as shown in FIG. 4(c), and a sinusoid can be fit through the centers of the operator-defined segmentation masks 70 to track the center of the object 62 through the other data frame images 60. All objects are known to exhibit sinusoidal traces of exactly one hertz, so the track the object 62 can be determined by fitting a one hertz sine wave through the centers of the operator-defined segmentation masks 70. Once the approximate centers of the object outlines in the remaining data frame masks 70 are known, the flood-fill algorithm can be used to identify the remaining pixels within the object outlines, yielding a complete set of segmentation masks 70 throughout the set of angularly distinguished data frame images 60.

The Connected Threshold method is quick and easy to use but can experience difficulties finding the object boundaries within data frame images 60 in which the object is significantly attenuated or otherwise obscured. FIG. 4(c) depicts a set of sinograms 80 from a plurality of rows of the data frames 60 laid horizontally end to end in a panoramic visualization along a spiral sweep of the target body 20, where the vertical axis corresponds to the x' axis of the camera 10 and the horizontal axis corresponds to the progression of angles θ around the rotational axis R. The projection data from one row exhibiting a single cycle of variation is appended to projection data from succeeding rows at increasing increments along the z axis, each also exhibiting a single cycle of variation. The object 62 appears in the set of sinograms 80 as a set of circumferential traces 66, and the object 64 appears in the set of sinograms 80 as a set of circumferential traces 68. FIG. 4(d) shows a panoramic sinogram view the corresponding trace 72 of the segmentation masks 70 created using the connected threshold method.

Detailed steps for practicing the method are as follows:
1. Review data frame images collected at successive angular increments around the rotational axis.
2. Identify a data frame image in which the object outline appears in isolation from other objects or features.
3. Select one or more pixels within an isolated object outline.
4. Apply a flood-fill algorithm to identify the remaining pixels within the isolated object outline and thereby define a segmentation mask within which the object is located and without which the object is not located.
5. Optionally adjust the size of the segmentation mask by varying the conditions for identifying individual pixels as being within the object outline.
6. Repeat steps 1–5 to define additional segmentation masks within other of the data frame images in which the object appears in isolation for a total of at least four or five segmentation masks.
7. Reformatting the set of data frames distinguished by acquisition angle θ into a set of sinograms distinguished by the z component of the data frames.
8. Approximate a center of the object based on the object outlines defined by the segmentation masks, such as, by fitting sinusoidal curve through centers of segmented masks as they appear in the sinogram presentation of the projection data.
9. Use the approximated center to select pixels within the object outlines of the remaining data frame images.
10. Apply the flood-fill algorithm to identify the pixels within the object outlines of the remaining data frame images and thereby complete a set of segmentation masks of the object throughout a range of the data frame images.
11. Optionally exploit assumptions regarding the object in connection with the preceding step to limit the amount of allowable pixel shifts between the segmentation masks of angularly adjacent data frame images.
12. Optionally exploit a systematic redundancy in connection with the previously preceding step to choose between paired data frame images acquired at 180° intervals to define a common mask based on the clearer of the two views of the same object outline.

Sinusoidal Edge Fitting:

Relying on an assumption that objects exhibit one-hertz sinusoidal traces, the boundary points (edges) of the operator-defined masks are interpolated by fitting one-hertz sinusoids to create new segmentation mask boundaries within the remaining data frame images. The new mask boundaries are then flood-filled to create segmentation masks on the remaining frames. The flood-fill algorithm of the Connected Threshold method starts with a seed pixel and proceeds to find the boundaries of the object outline. The flood-fill algorithm of the Sinusoidal Edge Fitting method starts with an approximation of boundaries and proceeds to fill the space between them.

The Sinusoidal Edge Fitting method is more complex and slower than the Connected Threshold method but works well on highly attenuated data and on data frames in which the object outline is obscured. The method, however, is highly dependent upon the representativeness of the operator-defined segmentation masks 70 and can lead to the creation of segmentation masks that miss or occupy areas where object 62 is not present. FIG. 4(e) shows a trace 74 of segmentation masks 70 in a panoramic sinogram view created using the Sinusoidal Edge Fitting method.

Detailed steps for practicing the method are as follows:
1. Follow steps 1–7 of the Connected Threshold method.
2. Fit sinusoids through opposite side edges of the operator-defined segmentation masks appearing in sinograms. A new pair of sinusoids is fitted for each sinogram in which the object exists.
3. Apply a flood-fill algorithm to identify the remaining pixels between the sinusoid pairs and thereby define additional segmentation masks of the object throughout a range of the data frame images.

Modified Sinusoidal Edge Fitting:

A combination of above two methods can be used to obtain more accurate results at a cost of additional processing time. The Connected Threshold method is used to define a set of temporary segmentation masks throughout the range of data frame images. The Sinusoidal Edge Fitting method is used to fit sinusoids through opposite side edges of the object outlines defined by the set of temporary segmentation masks produced by the Connected Threshold method. In comparison to the Sinusoidal Edge Fitting method, which fits boundary sinusoids through the limited set of operator defined segmentation masks, the Modified Sinusoidal Edge Fitting method fits boundary sinusoids through the entire range of data frames fit with segmentation masks by the Connected Threshold method. FIG. 4(f) shows a trace 76 of the segmentation masks 70 in a panoramic sinogram view created using this method.

Detailed steps for practicing the method are as follows:
1. Follow steps 1–12 of the Connected Threshold method.
2. Fit sinusoids through opposite side edges of the segmentation masks appearing throughout the range of data frames. A new pair of sinusoids is fitted for each sinogram in which the object exists.
3. Apply a flood-fill algorithm to identify the pixels located between the sinusoid pairs and thereby define a complete set of segmentation masks of the object throughout a range of the data frame images.

A flow chart shown in FIG. 5(a) lays out an overall procedure for spatially isolating an object 62 (40) from its setting within the projected data collected in the data frame images 60 (30) and reformatted into set of sinograms 80 (50). The result is a set of segmentation masks 70 defining by way of relative inclusion and absolute exclusion, the location of the object 62 (40) within the target body 20. The segmentation masks 70 have corresponding definitions within both the co-axial data frame images 60 distinguished by the acquisition angle θ and the sinograms 80 distinguished by the axial z coordinate of the transaxial slices intended for imaging in real space.

A file 100 containing the projection data collected in data frames is loaded into a processor 211 (see FIG. 8) at step 101 and subsequently imaged at step 102 onto a computer display or other interactive tool. Although automatable, an operator at step 103 preferably reviews the data frame images 60 collected at successive angular increments θ around the rotational axis R and identifies a data frame image 60 in which the object outline appears in isolation from other objects or features. In the succeeding step 104, the operator employs a selection tool such as a computer mouse to select one or more pixels within the object outline. A filling tool in the form of a flood-fill algorithm is employed in the next step 105 to identify the remaining pixels within the isolated object outline. The set of pixels enclosed by the object outline defines a segmentation mask within which the object is located within the projection data at, as yet, some unresolved depth. However, the remaining volume of pixels outside the segmentation mask can be excluded from the potential space occupied by the object. An optional adjustment is made to the size of the segmentation mask at step 106 by varying the conditions for identifying individual pixels as being within the object outline. For example, the operator can adjust the size of the segmentation mask 60 using a threshold slider bar or by clicking dilate or erode buttons.

At step 107, a decision is made as to whether enough segmentation masks have been defined to support further procedures for defining segmentation masks in the remaining data frame images in which the outline of the object does not necessarily appear in isolation. Generally, processing is returned to step 103 for defining additional segmentation masks among the data frame images in which the object appears in isolation until a total of four or five segmentation masks have been so defined. The following step 108 involves reformatting the projection data from the data frame images 60 into sinograms 80 that reference one dimension (x') of the data frame images 60 to the acquisition angle θ in which the projection data was collected. The reformatting of the projection data into sinograms can take place earlier or later in the processing, depending upon the need to view or otherwise process the projection data in the alternative format.

A choice is made at step 109 between the available methods for completing segmentation masks 70 for the remaining data frame images 60 and determining the object location referenced with respect to either the set of data frame images 70 or the corresponding set of sinograms 80. The further steps for practicing the Connected Threshold (110), Sinusoidal Edge Fitting (111), and Modified Sinusoidal Edge Fitting (112) methods are laid out above.

The next section of the flow chart 100, which continues into FIG. 5(*b*), deals with determining which of the photon counts originate within the region of space occupied by the object 62. The photon counts registered in the data frames are collected in the form of projection rays spanning lines through the pixels (i, j) of the desired image in real space. The probability that an individual pixel (i, j) located along the lines of projection contributes to the photon counts registered in the data frames is influenced by a number of factors including the effects of attenuation, scatter, detector efficiency, radiological decay, and background noise. However, if no other objects are located along the lines of projection, then it is possible to attribute substantially all of the photon counts to the isolated object except for the attendant background noise. On the other hand, if other objects, e.g., the object 64, periodically interrupt the lines of projection through the isolated object 62, then affects associated with the approximate location of the isolated object 62 along the lines of projection should be considered. At step 114, a decision is made as to whether any other objects, e.g., the object 64, overlap the projection lines through the isolated object 62 to route further processing between different routines, which are separately described below.

Segmenting Non-Overlapping Objects:

The non-overlapping sinusoidal traces are much easier to segment than the overlapping sinusoidal traces. After the object mask 70 is created, a small amount of intensity is left behind in the original image and the remaining intensity is taken out in the segmented object. The small amount of intensity, which is usually white noise, is left behind so that the remaining image does not show a black hollow space in the segmented region. The range (magnitude) of the noise is made equal to the intensity of the background pixels in the original data frame images 60.

FIG. 6(*a*) shows an alternative data frame image 120 of an object 122 amongst a background 124, and FIG. 6(*b*) shows a segmentation mask 130 fitted over the object 122. FIG. 6(*c*) shows a panoramic array of sinograms 140 located end to end for displaying circumferential traces 126 of the object 122 as incrementally varying in the z direction. FIG. 6(*d*) shows a segmentation mask trace 142 covering the object traces 126 within the same set of sinograms 140. With the selected object 122 being substantially isolated in all views, the steps of mask creation and data segmentation can be carried out together without manual intervention.

Segmenting Overlapping Objects:

Segmenting two or more overlapping sinusoidal traces 156 and 158, as shown in FIG. 7(*c*) in such a way that each underlying object 152 or 154 is attributed its own portion of intensity (photon counts), is important for both image enhancement and quantitative analysis. The region where the two sinusoidal traces 156 and 158 overlap each other has the higher intensity. In fact, it is largely the sum of the local intensities of the two sinusoidal traces 156 and 158. With reference to FIG. 7(*e*), it can be seen that intensities within the bounds of a segmentation trace 162 are higher where the sinusoidal traces 156 and 158 overlap each other. If all the intensity is attributed to just the one object 152 covered by the trace 162 of the sinusoidal masks 160, then an intensity void would be created in the overlapping space occupied by the other object 154. Accordingly, it is important to appropriately divvy the measured intensity between the two objects 152 and 154. This would be a straightforward matter if the intensities of objects 152 and 154 remained constant throughout the set of data frames 150, but due to various reasons including object shape and attenuation, the object intensities tend to vary from data frame to data frame. The effect of attenuation on intensity is predictable based on knowledge of the attenuating medium and the location of the object within the attenuating medium with respect to the camera position at which the projection data is gathered. The predictable effects of attenuation can be used to attribute different photon counts to objects based on their locations. Separate formulations are presented below for attenuation through air and body tissues.

Attenuation Through Air:

The photons emitted by radiating nuclear medicine elements (radiotracers) undergo varying amounts of attenuation due to distances traveled through air from the object to the gamma camera. This is why, in the data frame images, an object appears to have a higher intensity (or looks more dense) when closer to the camera and appears to have much lower intensity (or looks much dim) when farther away. Predictions based on this expected change in intensity can be used to distinguish the intensity contribution of a particular object from the raw projected data. A model shown in FIG. 8 illustrates variables involved with locating an object 240 with respect to the gamma camera 210.

During the PET/SPET data collection process, the camera 210 typically rotates around a target body, which is equivalent to the referenced object 240 rotating around the same rotational axis R in front of a stationary camera 210. If r is the radius of rotation of camera 210 and d is distance of object 240 from the center of rotation R, then the distance S of the object 240 from the camera 210 at any given angle θ is as follows:

$$S = r + d \sin \theta$$

Attenuation is not linear function of the distance S but changes exponentially with the change in distance of the object 240 from the camera 210. Assuming α as the attenuation coefficient radiating element and S as the distance of the object 240 from the camera, then the attenuation factor Att is given as follows:

$$Att = \exp(-\alpha S)$$

Combining the above two equations, the attenuation factor Att can be written in terms of angle θ as follows:

$$Att = \exp(-\alpha(r + d \sin \theta))$$

Attenuation Through Body Tissues:

The photons emitted by radiating nuclear medicine materials (radiotracers) exhibit further attenuation while passing through body tissues, whose effects can also vary with density and other factors. If a person is sufficiently lean, the extra attenuation caused by the body tissues can be largely discounted as a small portion of the distance variation, but if the person is heavy then the attenuation variations attributable to the passage of photons through the body tissue become more significant.

The same equations can be used for finding the attenuation through body tissue. However, the attenuation coefficient α of the body tissue differs from the attenuation coefficient α of air, and further consideration is needed for determining the width of the body tissues through which the photons are passed before reaching the camera. FIG. 9(a) shows how the distance b that the radiation travels through body tissue can be distinguished from the distance a that the radiation travels through air before reaching the camera 210. Usually, a thin edge appears in the data frame image defining the target body outline. FIG. 9(b) shows the outline trace 226 of the target body 220 appearing in a sinogram presentation of the projected data. Measures of distance along the x' axis of the sinograms between an object trace 246 and the target body outline trace 226 can be used to measure the distance b photons travel through the target body 220 along projection lines oriented at right angles. In other words, the distance measures gathered at angular orientations of θ plus or minus 90° can be used to measure the distances b photons travel through the body tissue at angular orientations of θ degrees.

Considering the above-two attenuation factors, the intensity variations of a particular object 240 can be predicted based on its location in the raw data, and this allows for an estimate to be made of the intensity attributable to the object 240 within the raw projection data. FIG. 10(a) shows a panoramic extension of the sinogram 250 in which a segmentation mask trace 252 is superimposed on the object trace 246 based on one of the above-described methodologies. Superimposing a plot 255 of the expected attenuation influences in accordance with the above equation yields a distorted sine wave as shown in FIG. 10(b) over the intensity data. The plot 255 illustrates how the intensity of a particular object 240 is expected to change within the projection data as a result of its known location, and thus helps accurately distinguish its contribution of intensity to the projected data. The amount of intensity below the plot line 255 is moved to the segmented image already spatially defined by the segmentation mask trace 252 and the rest of the intensity is left in the remainder image.

FIG. 11(a) shows a data frame image 260a segmented by removal of the estimated intensity contribution of an object 262. A companion object 264 is not affected by the removal. FIG. 11(b) shows a corresponding data frame 260b in which only the segmented object 262 remains. Sinograms 280a and 280b of FIGS. 11(c) and 11(d) illustrate the segmented data associated with the two sets of data frame images 260a and 260b. FIG. 11(c) depicts a panoramic range of projection data in which the intensity effects of the object 262 have been removed. FIG. 11(d) depicts a corresponding range of projection data in which the intensity effects of the object 262 have been isolated. Image reconstructions of both sets of segmented data can be made using conventional reconstruction algorithms. The intensity data associated with the object 262 can be determined both as a function of position and the time of acquisition based on the raw projection data independent of the filtering effects of image reconstructions.

Returning to the flow chart within FIG. 5(b), steps 270 through 274 describe a preferred procedure for attributing intensity values to an object space previously derived from the projection data. At step 270, photon counts corresponding to the pixels within the segmentation mask trace 252 are averaged along the lengths of the set of sinograms 260 shown in FIG. 10(a). Attenuation effects through air and body tissue are calculated at steps 271 and 272 for estimating the intensity segmentation line 255 at step 273. Object segmentation takes place at step 274 where intensities below the segmentation line 255 are attributed to the object, such as shown in FIG. 11(d), and intensities above the segmentation line 255 are left with the remainder of the image distributed throughout the area covered by the segmentation mask trace 252, such as shown in FIG. 11(c).

Steps 280 through 283 describe a preferred procedure for distinguishing intensity values belonging to the object from intensity values belonging to the background occupied by the object. At step 280, white noise is generated within the masked region of one of the data frame images. The generated noise is subtracted from the intensity values collected within the masked region in step 281 and the remaining intensity values are attributed to the object. As set forth in step 282, the original intensity values are replaced by the generated noise values within the masked region to estimate the condition of the data frame if the segmented object had not been present. The process of steps 280 through 282 are repeated as instructed by step 283 until the object has been segmented from the entire set of data frame images.

Regardless of the manner of segmentation, the spatially defined object together with its segmented intensity values is stored in an object projection data file 290 at step 291 for further processing. A decision is made at step 292 if more objects are to be similarly segmented from the projection data. If yes, control is returned to step 103 for creating new segmentation masks. If no, the remaining projection data is saved at step 295 into a remaining projection data file 300 for further processing.

Both the segmented data of the segmented objects from the object projection data file 290 and the remaining projection data from the remaining projection data file 300 are now available for further processing and imaging. The data is still unreconstructed, statistically independent and quantifiable for extracting measurements. For example, the total radiological counts of each object as a function of both acquisition angle and time are immediately available. Image reconstructions can also exploit the segmented data in a variety of ways. For example, the projection data from the remaining projection data file 300 can be reconstructed for imaging the remaining features and objects without the influence of the segmented objects. This is particularly advantageous if the segmented objects are high intensity objects of marginal interest that would otherwise obscure the imaging of the more important objects or features. Composite images can be assembled from separate reconstructions of the segmented data, where one or more of the segmented objects remains of interest but would otherwise obscure the reconstruction of other objects of interest.

The components of a composite image are illustrated in FIGS. 12(a) and 12(b). A reconstruction of a segmented object appears in FIG. 12(a), and a separate reconstruction of the remaining projection data appears in FIG. 12(b). The two reconstructions of the same transaxial space are combined in FIG. 12(c). Each of the separate reconstructions of FIGS. 12(a) and 12(b) can exploit a full range of intensity display values for optimizing resolution. For example, the reconstructions can be made at different intensity scales. Within the composite image of FIG. 12(c), the intensity scales of the separate reconstructions can remain independent of each other such as by using different color scales for the two reconstructions. Variations in hue, saturation, and brightness can be exploited for these purposes. FIG. 12(d) shows a reconstruction of the original unsegmented projection data set for purposes of comparison. Artifacts appearing in the reconstructed image of the original data set obscure potentially important features revealed by the segmented and composite reconstructions.

The segmented projection data can also be processed to provide statistically independent assessments of radiological activities. For example, total radiological counts per object can be measured as well as variations in radiological counts over time. Information extracted from the segmented data can also appear in numeric or other symbolic forms together with the reconstructed images. For example, radiological accumulation or discharge can be represented in a vector form.

Although described with respect to a limited number of embodiments, the broader teaching of the invention is instructive for carrying out the invention in many more ways, including the ways data is collected, processed, and displayed.

What is claimed is:

1. A system for identifying objects among unreconstructed data in image tomography comprising:
   a detector for collecting raw data in the form of photon counts organized as a set of images from a plurality of angular positions around a rotational axis;
   a viewer for viewing the set of images as pixel arrays having a first dimension substantially traverse to the rotational axis and a second dimension substantially parallel to the rotational axis for referencing locations at which the photon counts are collected;
   a selector tool for selecting one or more pixels appearing within an object in at least one of the images;
   a filling tool for identifying pixels that are contiguous to the selected one or more pixels and that satisfy a condition for being within the object;
   an interpolation tool for inferring which among the pixels in other of the images are also within the object; and
   a data structure for representing the object based on the pixels appearing within the object through the set of images as a collection of traces circumscribing the rotational axis at different linear positions along one of the first and second dimensions of the pixel arrays.

2. The system of claim 1 in which the interpolation tool relies in part upon an assumption that the circumscribing traces have a sinusoidal form with a unit frequency.

3. The system of claim 1 in which each of the circumscribing traces is located within one of a set of sinograms having a first axis for delineating distances along one of the first and second dimensions of the pixel array and a second axis for delineating angular positions around the rotational axis.

4. The system of claim 1 in which the circumscribing traces of the object contain photon counts collected from the object as well as other photon counts collected from other objects within the set of images that are intermittently coincident with the circumscribing traces.

5. The system of claim 4 in which a data processor provides for distinguishing the photon counts within the circumscribing traces that are collected from the object from other photon counts that are collected from the other locations by estimating expected variations in the photon counts with angular positions around the rotational axis as a result of distance variations between the object and the detector.

6. The system of claim 1 in which the pixels identified by the filling tool contribute to identifying portions of a plurality of the traces at different linear positions along the rotational axis.

7. The system of claim 1 in which the selector tool selects one or more pixels appearing within an object in a plurality of the images.

8. The system of claim 7 in which the object appears in isolation from other objects within the plurality of images in which the pixels are selected.

9. A method of determining areas occupied by an object within sinograms of unreconstructed tomographic data, comprising the steps of:
   collecting photon counts along two spatial dimensions at each of a plurality of angular increments around a rotational axis, one of the spatial dimensions having at least a component transverse to the rotational axis and another of the spatial dimensions having at least a component along the rotational axis;
   arranging the photon counts in a set of data frames with each of the data frames having a pixel array referencing locations of the photon counts along the two spatial dimensions at one of the angular increments;
   selecting one or more pixels within an outline of an object from at least one of the data frames;
   identifying pixels that are contiguous to the selected one or more pixels in the at least one data frame and that satisfy a condition for being within the outline of the object;

inferring pixels within other outlines of the same object appearing in other of the data frames;

rearranging the pixels throughout the set of data frames into a set of sinograms having a first dimension referenced to one of the two spatial dimensions along which the photon counts are collected and a second dimension referenced to the angular increments around the rotational axis at which the photon counts are collected; and representing the pixels within the outlines of the object as a set of circumferential traces within the set of sinograms, such that each circumferential trace defines a prescribed area within one of the sinograms occupied by the object.

10. The method of claim 9 in which the step of selecting includes:

inspecting the set of data frames to identify one or more images in which the object appears in isolation from other objects appearing within the set of data frames, and selecting one or more pixels within the outline of the object from each of a plurality of the data frames in which the object appears in isolation.

11. The method of claim 10 in which the step of selecting includes selecting one or more pixels within the outline of the object from each of at least four of the data frames in which the object appears in isolation.

12. The method of claim 9 in which the step of identifying includes forming a mask that defines an area bounded by the outline of the selected object within the data frame, and including an additional step of adjusting the size of the mask area in one or more directions.

13. The method of claim 12 in which the step of adjusting includes changing the condition that is required to be satisfied for identifying a pixel as being within the outline of the object.

14. The method of claim 9 in which the step of inferring includes locating interior points within a plurality of outlines of the selected object appearing in different data frames and fitting a curve through the interior points to identify other pixels within the outlines of the same object appearing in other of the data frames.

15. The method of claim 14 in which the step of inferring also includes identifying pixels that:

(a) are contiguous to the pixels fitted by the curve in the other data frames, and (b) satisfy a condition for being within the outlines of the object.

16. The method of claim 15 in which the step of inferring includes precluding the identification of pixels that extend beyond the outline of the object in an angularly adjacent data frame by a prescribed amount.

17. The method of claim 16 in which the step of collecting collimated photon counts includes collecting collimated photon at pairs of angular increments, where the members of each pair are separated by 180° around a rotational axis, and in which the step of inferring includes choosing between the data frames separated by 180° to more clearly assess the outline of the object.

18. The method of claim 9 in which the step of identifying includes:

identifying pixels that are contiguous to the selected one or more pixels in a plurality of data frames, and forming masks that define areas bounded by the outlines of the selected object within the data frames.

19. The method of claim 18 in which the step of inferring includes fitting curves through the outlines of the object for defining boundaries of the circumferential traces within the set of sinograms.

20. A method of spatially distinguishing a selected object from unreconstructed tomographic data comprising steps of:

collecting photon counts at each of a plurality of angular increments around a rotational axis;

spatially referencing the photon counts in data frames as angularly distinguished silhouettes of the target body;

forming masks over areas bounded by outlines of a selected object within the data frames; and segmenting the photon counts within the masks for distinguishing the selected object from other features of the target body.

21. The method of claim 20 in which the step of collecting photon counts includes collecting the photon counts along two spatial dimensions at each of a plurality of angular increments around a rotational axis, one of the spatial dimensions having at least a component transverse to the rotational axis and another of the spatial dimensions having at least a component along the rotational axis.

22. The method of claim 21 in which the step of spatially referencing the photon counts includes arranging the photon counts in a set of data frames with each of the data frames having a pixel array referencing locations of the photon counts along the two spatial dimensions at one of the angular increments.

23. The method of claim 22 in which the step of forming masks includes:

selecting one or more pixels within the outline of the selected object from at least one of the data frames;

identifying pixels that are contiguous to the selected one or more pixels in the at least one data frame and that satisfy a condition for being within the outline of the object; and inferring pixels within other outlines of the same object appearing in other of the data frames.

24. The method of claim 23 in which the step of segmenting includes:

rearranging the pixels throughout the set of data frames into a set of sinograms having a first dimension referenced to one of the two spatial dimensions along which the photon counts are collected and a second dimension referenced to the angular increments around the rotational axis at which the photon counts are collected; and representing the pixels within the outlines of the object as a set of circumferential traces within the set of sinograms, such that each circumferential trace defines a prescribed area within one of the sinograms occupied by the object.

25. The method of claim 20 including an additional step of quantifying photon counts within the selected object.

26. The method of claim 20 including an additional step of temporally referencing the photon counts for measuring radiological change within the selected object.

27. A method of producing a composite image of a target body cross section based on multiple reconstructions of different segments of tomographic data, comprising steps of:

collecting collimated photon counts emitted by a target body at each of a plurality of angular increments around a rotational axis;

spatially referencing the photon counts as statistically independent data corresponding to angular progressions about the target body;

segmenting the statistically independent data corresponding to the angular progressions about the target body into at least first and second data segments containing different portions of the statistically independent data;

reconstructing a first cross-sectional image of the target body from the first data segment;

reconstructing a second cross-sectional image of the target body from the second data segment; and combining the first and second cross-sectional images of the target body to provide a composite image of the target body.

28. The method of claim 27 in which the step of spatially referencing the photon counts includes arranging the photon counts in data frames containing angularly distinguished silhouettes of the target body.

29. The method of claim 28 including an additional step of forming masks over areas bounded by outlines of a selected object within the data frames for distinguishing between the first and second data sets.

30. The method of claim 27 in which the first and second cross-sectional images are visually distinguishable, having radiological values referenced to different scales.

31. The method of claim 30 in which the first and second cross-sectional images are visually distinguishable on different color scales.

32. The method of claim 27 including an additional step of quantifying photon counts within at least one of the first and second data sets based on the statistically independent data.

33. The method of claim 32 in which the step of quantifying photon counts includes separately quantifying photon counts within the first and second data sets based on the statistically independent data.

34. The method of claim 32 in which the step of quantifying photon counts includes graphically representing the quantifying photon counts in the composite image.

35. The method of claim 27 including an additional step of temporally referencing the photon counts for measuring radiological change within at least one of the first and second data sets.

36. The method of claim 35 in which the step of temporally referencing the photon counts includes separately temporally referencing the photon counts for measuring radiological change within the first and second data sets.

37. The method of claim 35 in which the step of temporally referencing the photon counts includes graphically representing the temporally referenced photon counts in the composite image.

* * * * *